United States Patent
Bagheri et al.

(10) Patent No.: US 6,839,392 B1
(45) Date of Patent: Jan. 4, 2005

(54) METHODS AND APPARATUS FOR ADAPTIVE MIMIC REJECTION

(75) Inventors: Mehran Bagheri, Califon, NJ (US); Jaime Tadeo Mitchell, Bethlehem, PA (US); Richard C. Witinski, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/406,030

(22) Filed: Sep. 27, 1999

(51) Int. Cl.$^7$ .............................. H04L 7/00; H04J 3/06
(52) U.S. Cl. ...................... 375/368; 375/354; 375/365; 370/514
(58) Field of Search ................. 375/368, 341, 375/355, 365, 366, 354, 369, 370, 357, 359; 370/506, 509, 105.1, 100.1, 105, 105.2, 105.4, 106, 112, 514

(56) References Cited

U.S. PATENT DOCUMENTS

| | | | |
|---|---|---|---|
| 3,621,140 A | | 11/1971 | Griffiths et al. |
| 4,316,284 A | | 2/1982 | Howson |
| 5,056,119 A | | 10/1991 | Sakalian et al. |
| 5,377,209 A | * | 12/1994 | Skinner et al. ........... 370/105.1 |
| 5,598,444 A | * | 1/1997 | Lim ........................... 375/368 |
| 5,608,734 A | * | 3/1997 | Sandler et al. .............. 370/509 |
| 5,621,773 A | * | 4/1997 | Varma et al. ............... 375/368 |
| 5,680,421 A | | 10/1997 | Shiino et al. |
| 5,809,093 A | * | 9/1998 | Cooper ....................... 375/365 |
| 5,953,378 A | * | 9/1999 | Hotani et al. ............... 375/341 |
| 6,389,088 B1 | * | 5/2002 | Blois et al. ................. 375/355 |
| 6,400,732 B1 | * | 6/2002 | Castagna et al. ........... 370/506 |

* cited by examiner

*Primary Examiner*—Stephen Chin
*Assistant Examiner*—Sam K. Ahn
(74) *Attorney, Agent, or Firm*—Ryan, Mason & Lewis, LLP

(57) ABSTRACT

Methods and apparatus for use in aligning frames in a receiver of a data transmission system include checking one or more bit positions associated with a received data stream to determine a number of bits in the bit positions, respectively, that match a predetermined bit pattern. The number for a bit position is compared to a first threshold value and a second threshold value. A bit position is identified as being associated with a false framing pattern or mimic when the number is not less than the first threshold value. A bit position is identified as a potential framing bit position or possible framing bit position when the number is not less than the second threshold value. The first threshold value is changed when a bit position is identified as a potential framing bit position and another bit position is identified as being associated with a false framing pattern. For example, the first threshold value may be increased by a given value for every frame that a bit position is identified as a potential framing bit position and another bit position is identified as being associated with a false framing pattern. The given value may be a value of one, a value less than one, or a value greater than one. Frame alignment is declared when a bit position is identified as a potential framing bit position and no other bit position is identified as being associated with a false framing pattern.

15 Claims, 4 Drawing Sheets

METHODS AND APPARATUS FOR ADAPTIVE MIMIC REJECTION

FIELD OF THE INVENTION

The invention relates generally to data transmission systems and, more particularly, to data transmission systems employing frame alignment techniques.

BACKGROUND OF THE INVENTION

Modern telecommunication systems transmit large amounts of data rapidly between data communications devices. In digital data transmission systems, the receiving equipment must be able to discern where in the bit stream being received from the transmitting equipment one distinct package, i.e., frame, of information ends and where the next frame begins. This is known as frame alignment. Frame alignment is performed both for a new transmission as well as an existing transmission where frame alignment is lost during the course of the transmission.

A commonly used standard for sending telephone signals in the United States is the International Telegraph and Telephone Consultative Committee (CCITT) Recommendation G.704, more commonly referred to as the T1 standard. A T1 system uses a 1.544 megabits/second pulse code modulation (PCM) digital signal. The T1 signal includes 24 time domain multiplexed channels, for carrying 24 separate channels, such as voice conversations, simultaneously on the single T1 carrier. In the T1 standard, eight bits comprise a single sample composed of one 7-bit A/D sample of one voice channel plus one signaling bit. A "frame" is defined as 24 samples, plus one framing bit termed the F bit which occupies the first bit position, for 193 total bits per frame. A superframe is defined as 12 frames. Each channel is sampled at an 8 KHz rate, so the T1 signal comprises 8000 193-bit frames per second, or 1.544 megabits/second.

In a data transmission system such as a T1 system, a frame alignment unit, i.e., frame aligner, within a data receiver searches the incoming bit stream for a framing detection pattern. When the frame aligner identifies the framing pattern, the unit declares a frame alignment condition.

In order to prevent framing onto a false framing pattern, a conventional frame aligner only declares frame alignment when there are no false framing patterns present. This is because the conventional frame alignment algorithm employed by a frame aligner is not capable of discerning the difference between a false framing pattern and the true framing pattern. Thus, conventional frame alignment units wait until the false framing patterns go away and there is only one frame detection candidate left. The remaining candidate is then chosen as the frame alignment position. During the wait, new false framing patterns may appear and these must also go away before a frame alignment position can be chosen. In a conventional frame alignment algorithm, the minimum false framing pattern length, i.e., false framing pattern threshold, is fixed. That is, such frame alignment algorithms maintain a fixed false framing pattern threshold regardless of how many frames have passed while the algorithm waits for the false framing patterns to go away, i.e., fall below the fixed false framing pattern threshold. However, setting fixed thresholds extends the time necessary to find frame alignment. New false framing patterns may form while old false framing patterns disappear preventing frame alignment from being found.

Therefore, there is a need for methods and apparatus for performing frame alignment which eliminate or at least reduce the effects associated with the shortcomings of the prior art as discussed above and which otherwise exist in the art.

SUMMARY OF THE INVENTION

The present invention provides methods and apparatus for improving frame alignment in a data transmission system. Particularly, the invention provides an adaptive false framing pattern a rejection methodology for implementation in a frame alignment unit of a data transmission system receiver. It is to be appreciated that the phrase "false framing pattern" may hereinafter also be referred to as a "mimic." Thus, the adaptive mimic rejection algorithm of the invention significantly speeds up the frame alignment process, particularly with respect to signals which contain a relatively large number of mimics.

In one aspect of the invention, a method for use in aligning frames in a receiver of a data transmission system includes checking one or more bit positions associated with a received data stream to determine a number of bits in the bit positions, respectively, that match a predetermined bit pattern. The number for a bit position is compared to a first threshold value and a second threshold value. A bit position is identified as being associated with a false framing pattern or mimic when the number is not less than the first threshold value. A bit position is identified as a potential framing bit position or possible framing bit position when the number is not less than the second threshold value. The first threshold value is changed when a bit position is identified as a potential framing bit position and another bit position is identified as being associated with a false framing pattern. For example, the first threshold value may be increased by a given value for every frame hat a bit position is identified as a potential framing bit position and another bit position is identified as being associated with a false framing pattern. The given value may be a value of one, a value less than one, or a value greater than one. Frame alignment is declared when a bit position is identified as a potential framing bit position and no other bit position is identified as being associated with a false framing pattern.

Advantageously, by employing such an adaptive process, the time required to declare frame alignment is significantly decreased, especially in a false framing pattern-rich signal. Thus, a receiver employing the inventive frame alignment process with adaptive mimic rejection realizes increased data throughput. While the invention is particularly suitable to a T1 data transmission system, the invention is not so limited.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary framing criterion such as may be employed in a T1 data transmission system. It should be understood, however, that the invention is not limited to use with any particular data transmission system. The invention is instead more generally applicable to any data transmission system in which it is desirable to improve the speed of frame alignment in order to realize concomitant benefits such as, for example, improving receiver data throughput.

Figure 1:
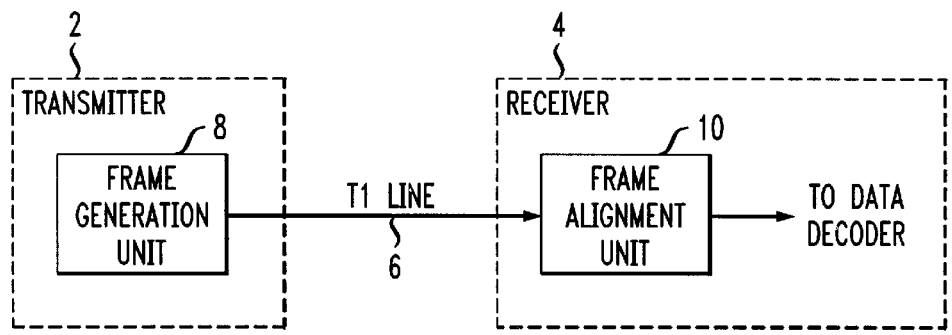
FIG. 1 is a block diagram illustrating an exemplary T1 data transmission system with which the frame alignment methodology of the invention may be employed.

Referring initially to FIG. 1, an illustrative T1 data transmission system with which the frame alignment methodology of the invention may be employed is shown. The system includes a transmitter 2 coupled to a receiver 4 via a T1 line 6. The transmitter 2 includes a frame generation unit 8 which specifies the frame format of the data stream to be transmitted and sets the frame detection pattern that is to be used by the receiver 4 to align the received data stream. The receiver 4 includes a frame alignment unit 10 which aligns or synchronizes the received data stream so that the frames of data may be accurately decoded and/or processed by other circuits of the receiver. The frame alignment procedure of the invention is preferably employed in accordance with the frame alignment unit 10 of the receiver.

Figure 2:
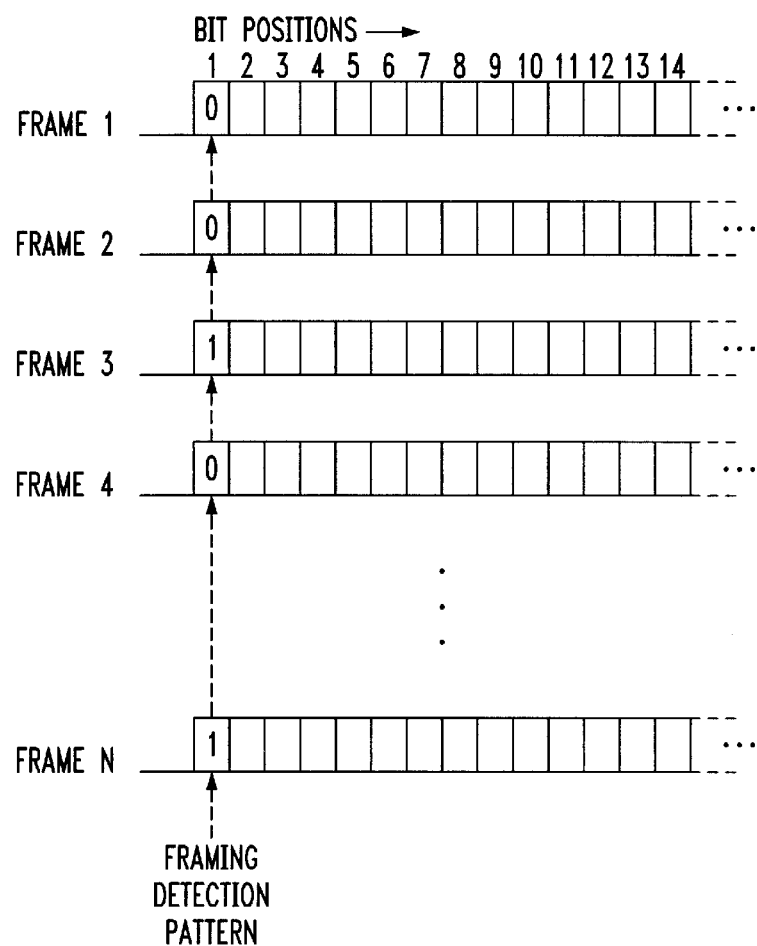
FIG. 2 is a graphical representation illustrating a framing detection pattern for use according to the present invention.

Referring now to FIG. 2, the concept of a framing detection pattern for use in accordance with the present invention is shown. At the transmitter 2 of the data transmission system, during frame generation, a particular bit pattern, e.g., 0010 . . . 1, is inserted into the frames of the data stream to be transmitted. This bit pattern is referred to as a frame detection pattern. The frame detection pattern is thus a sequence of frame bits specified for each particular type of frame format used in a data transmission system. As shown in FIG. 2, consecutive bits of the framing detection pattern, e.g., 0010 . . . 1, are inserted into the framing bit positions, e.g., bit position 1, of consecutive frames, e.g., frames 1 through N.

Since the receiver 4 does not necessarily know what frame or what bit position the data stream it has received starts at, it relies on the frame alignment unit 10 to make this determination and declare frame alignment. The frame alignment unit does this by locating the framing detection pattern in the received data stream and thus identifying the framing bit position. Given knowledge of the framing bit position and the framing detection pattern, the receiver knows the bit position and frame at which the data stream it has received starts.

Figure 3A:
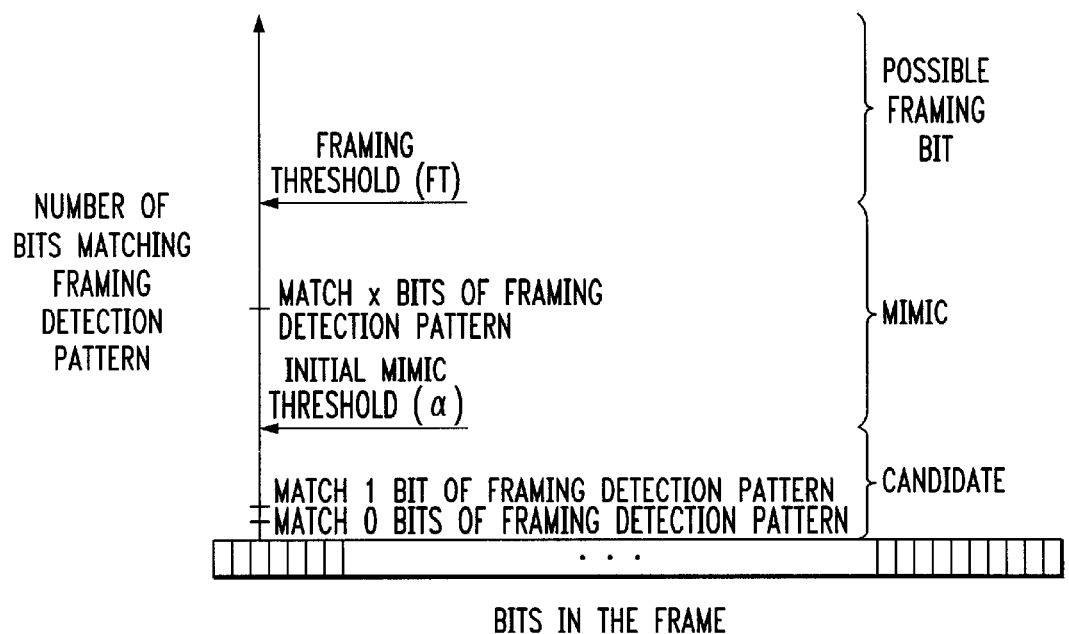
FIGS. 3A and 3B are graphical representations illustrating the concept of framing and mimic thresholds for use according to the present invention.
Figure 3B:
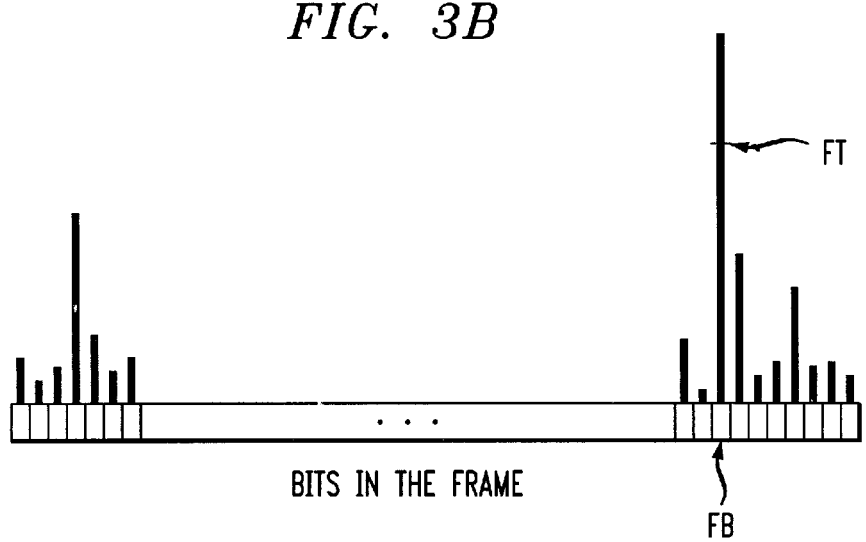

Referring to FIGS. 3A and 3B, graphical representations are shown illustrating the concept of framing and mimic thresholds for use in a frame alignment unit formed according to the present invention. As shown in FIG. 3A, a framing threshold (FT) is chosen so as to minimize the chance of alignment to a random data stream, i.e., a false framing pattern. Each bit position in a frame is a "candidate" for the framing bit position. This is because the frame alignment unit does not know which bit position in the data stream is the framing bit position.

Accordingly, each bit position is checked once a frame to determine if it contains a bit value that is consistent with the frame detection pattern. For example, in a T1 system where a frame contains 193 bits, the procedure includes checking each of the first 193 bit positions in the received data stream and each respective $193^{rd}$ bit thereafter to see which bit position contains the framing detection pattern. A framing detection pattern may contain 72 bits. Therefore, the full framing detection pattern would be evident by identifying the framing bit position over the 72 consecutive frames in which the pattern is present.

A check of each bit position results in either incrementing the number of frame detection pattern bits matched (i.e., vertical axis of FIG. 3A) or dropping the number of frame detection pattern bits matched to a lower number. The lower number may represent the largest match from the beginning of the frame detection pattern up to the current bit. For example, assume in a simple example that the framing detection pattern is 12 bits, e.g., 100011011100, and a particular bit position matches the first seven bits of the pattern, 1000110. If the next value in that bit position was a zero, when a one was expected, then the number of frame detection bits matched would drop back to three, 100. However, if the value was a one, the number of frame detection bits matched would increase to eight, 10001101. As can been seen, on a bit mismatch, the methodology of the invention provides for dropping back to the largest match possible that includes the beginning of the framing detection pattern and the bit just checked. In other words, in this example, the eighth bit received in the bit position under consideration was a zero and the sixth and seventh bits previously received were a one and a zero, respectively, resulting in a 100 being received. Since a 100 only matches the first three bits of the 12 bit framing detection pattern, the number of bits matched drops to three. A candidate that matches the frame detection pattern for the framing threshold number of bits (FT) is called a "possible framing bit," that is, a potential framing bit. A "mimic" is a candidate that has passed a threshold number of bits of the frame detection pattern, i.e., mimic threshold α. As illustrated in FIG. 3A, the mimic threshold is less than the framing threshold. As shown in FIG. 3B, the bit position referred to as FB is found to be the framing bit position since it is the only bit position that resulted in a pattern bit match number above the framing threshold FT. The relationship between the framing and mimic thresholds and a candidate, a mimic and a possible framing bit will now be explained.

As the data stream is being searched for the framing bit position, all bit positions of a frame are considered candidates. In the beginning of the frame alignment process, there are no mimics or possible framing bits. As the frame alignment process progresses, some of the candidates will begin matching the frame detection sequence When a candidate matches the mimic threshold number 0 of bits of the framing detection pattern, it becomes a mimic. At this stage of the frame alignment process, there are only candidates and a few mimics. For a period of time, some mimics will fail a check against the frame detection pattern and will be dropped to candidates and some candidates may grow into mimics. At some point, a mimic will pass the framing threshold becoming a possible framing bit. A check for other mimics is done and if there are no other mimics, this bit position becomes the framing bit position and frame alignment is declared. If there are mimics, that bit position remains a possible framing bit.

Each frame, a possible framing bit is checked to see if it continues to match the framing pattern sequence and a check is done to see if there are any mimics or other possible framing bits. If the possible framing bit does not continue to match the framing pattern sequence, the bit position then becomes a candidate. If the possible framing pattern does continue to match the framing pattern sequence and there are no mimics or other possible framing bits, this bit position becomes the framing bit position and frame alignment is declared. However, if there are mimics or other possible framing bits, the bit position remains a possible framing bit.

According to the invention, the frame alignment process adds a value β to the initial mimic threshold α for each frame that the first possible framing bit is waiting for all the mimics to go away, i.e., fall below the mimic threshold. It is to be appreciated that this effectively increases the mimic threshold, making it harder for a candidate to become a mimic. β is a positive number. A β value of 1 increases the mimic threshold by 1 bit each frame and thus prevents any new mimics from forming. That is, since the mimic threshold is being increased by one and you are only considering one more bit per frame, the number of frame detection pattern bits matched will not go above the adapted mimic threshold. A β value of less than 1 gradually increases the mimic threshold while allowing new mimics to form. A β value greater than 1 increases the mimic threshold more rapidly and removes the shortest mimics first while preventing new mimics from forming. Eventually, the mimic threshold reaches the framing threshold (FT). At this point, the mimic threshold stops advancing and there are only possible framing bits remaining that are preventing frame alignment. Then, the procedure includes selecting the possible framing bit that has been above the framing threshold FT the longest as the framing bit. Given identification of the framing bit and the framing detection threshold, the frame alignment unit declares frame alignment.

The adaptation of the mimic threshold according to the invention may be represented by the following equation:

$$M \leq \alpha + \beta W$$

where M is the current bit length of the mimic, a is the threshold bit length (minimum bit length of a mimic), β is the bit length increment and W is the number of frames since a possible framing bit has been found.

Figure 4:
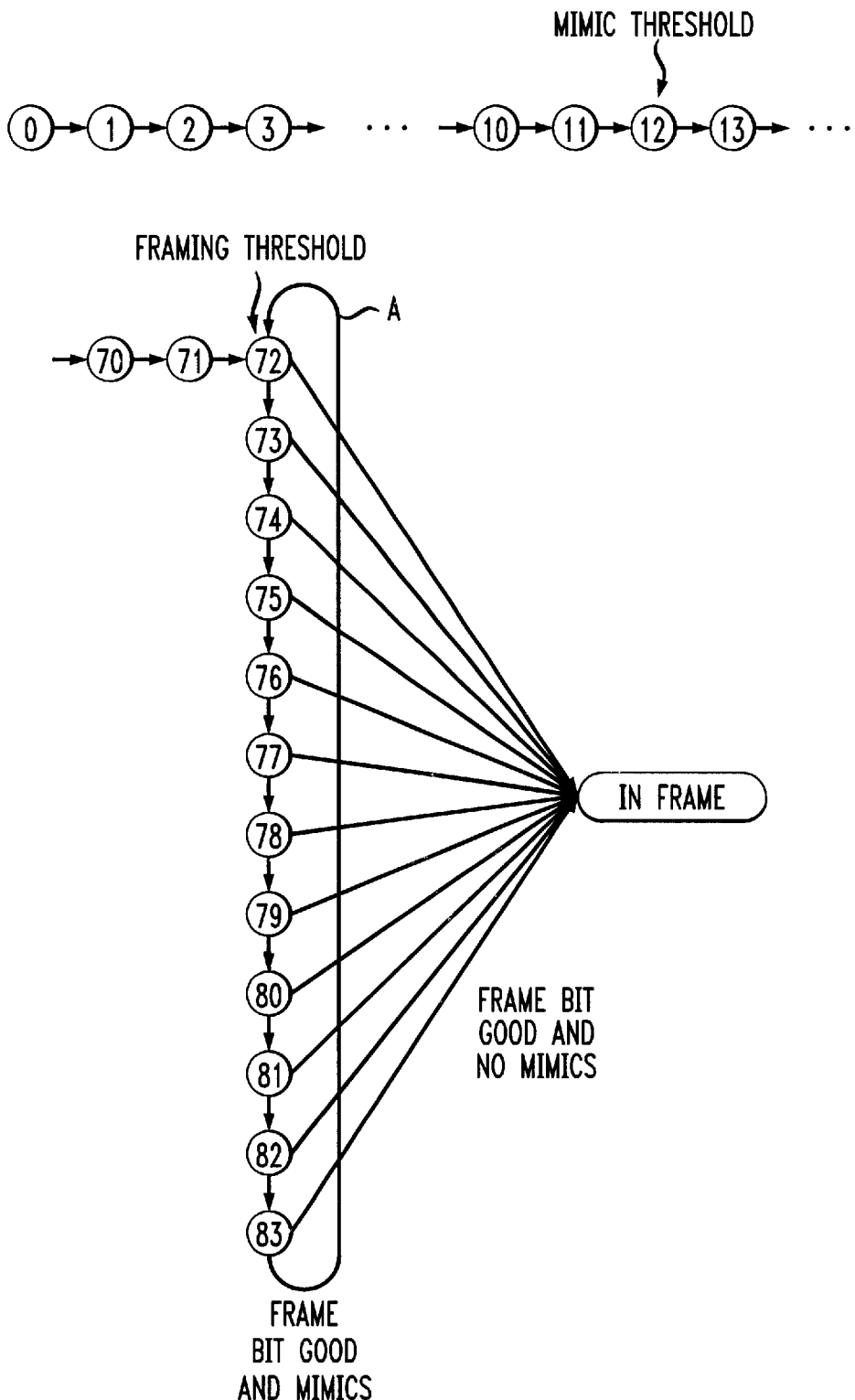
FIG. 4 is a state machine flow diagram illustrating a framing state machine according to one embodiment of the present invention.

Referring now to FIG. 4, a state machine flow diagram is shown which provides a graphical description of a framing state machine. Each state of the state machine is represented by a circle with a state number in it. In this embodiment, each state represents a bit position in a consecutive frame. Thus, incoming data bits are compared against a pattern. If the data bit matches the pattern bit required by its current state, the state machine can advance a state. Otherwise, it drops back to an initial state (state 0). The state number indicates how many pattern bits have matched. For the example shown, the mimic threshold is set at 12 frame pattern bit matches and the framing threshold FT is set at 72 frame pattern bit matches. When the framing threshold is reached and there are mimics present, the state machine rotates through a set of states in which the superframe alignment is maintained as long as the frame pattern continues to match. This is represented by the loop denoted by the letter A which includes states 72 through 83. Once all the mimics fail a pattern match, the state machine may advance from the maintenance states, i.e., loop A, to the frame alignment state. In order to hasten the elimination of mimics, as explained above, an offset β is added to the mimic threshold for every frame time after the framing threshold is reached.

It is to be appreciated that all of the states in the loop A in FIG. 4 are above the framing threshold. The states in the loop allow the state machine to identify the exact frame within the multi-frame framing format. The number of states in the loop is determined by the minimum number of frames within which the frame bit sequence repeats. For example, in the T1 superframe format, the frame bit sequence repeats every 12 frames. Hence, the 12-state loop as illustrated in FIG. 4. The T1 extended superframe format would use a 24 state loop. However, it is to be understood that the number of states is not always equal to the number of frames that describe the framing format, that is, for example, the loop may be longer.

Figure 5:
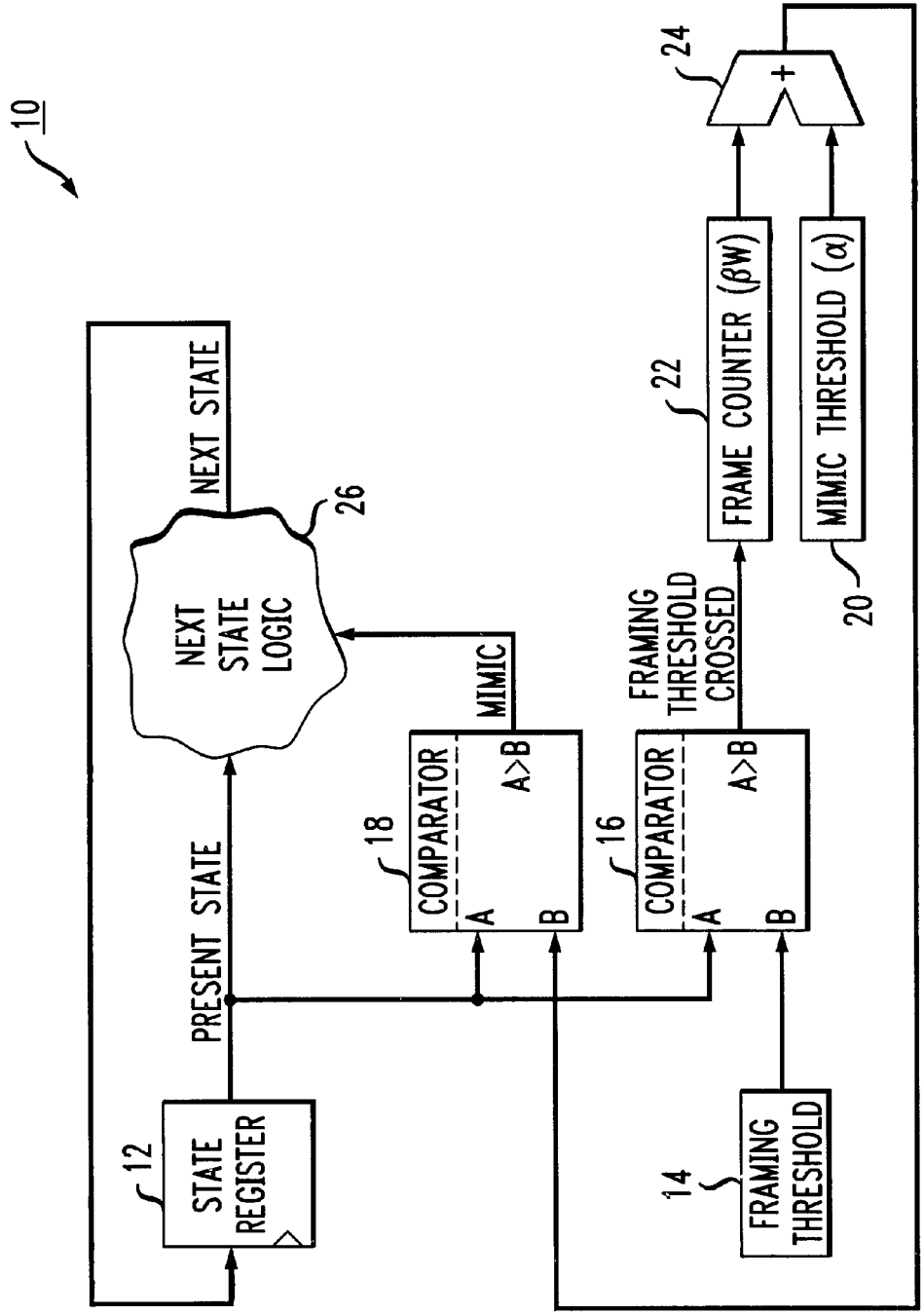
FIG. 5 is a schematic diagram illustrating a frame alignment circuit employing adaptive mimic rejection according to one embodiment of the present invention.

Referring now to FIG. 5, a schematic diagram illustrating a frame alignment circuit employing adaptive mimic rejection according to one embodiment of the present invention is shown. Similar to FIG. 4, the circuit diagram of FIG. 5 is based on states where a state is effectively a frame. Accordingly, the bit position in a particular frame, i.e., the present state, is considered. That is, its value is latched in a state register 12 and checked to see if it matches the frame detection pattern. If it does, the bits matched number (i.e., vertical axis of FIG. 3A) is increased, if not, it is decreased or at least is not increased. Then, the bits matched number is compared to the framing threshold (FT) 14 in a comparator 16 and to the mimic threshold in a comparator 18. If a possible framing bit has already been identified, the mimic threshold 20 is adapted for each frame that a mimic is still present. This is accomplished with frame counter 22 which keeps track of the number of frames. Thus, adder 24 adds the mimic threshold a and the value represented by βW. For example, β may be one. The sum is the new mimic threshold used by the comparator 18. If the result of the comparison is that a mimic still exists, i.e., a bit position has a bits matched number above the mimic threshold but below the framing threshold, the process continues onto the next state or frame. The value of the mimic threshold is increased by one for each frame that a possible framing bit is identified and a mimic still exists. If no mimic exists and a possible framing bit has been identified, this bit is considered to be the framing-bit and frame alignment is declared.

It should be noted that the invention, in general, and, specifically, the elements of the circuit illustrated in FIG. 5, may be implemented in a variety of ways. For example, the invention may be implemented via one or more processing devices such as, for example, discrete electronic logic, one or more application-specific integrated circuits, or one or more appropriately programmed processors with associated memory. Given the inventive teachings herein, one of ordinary skill in the art will contemplate various other implementations, embodiments and applications.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in aligning frames in a receiver of a data transmission system, the method comprising:

checking a bit position associated with a received data stream to determine a number of bits in the bit position that match a predetermined bit pattern and comparing the number to a first threshold value and a second threshold value, wherein a bit position is identified as being associated with a false framing pattern when the number is not less than the first threshold value and identified as a potential framing bit position when the number is not less than the second threshold value; and changing the first threshold value when a bit position is identified as a potential framing bit position and another bit position is identified as being associated with a false framing pattern.

2. The method of claim 1, wherein the first threshold value is increased by a given value for every frame that a bit position is identified as a potential framing bit position and another bit position is identified as being associated with a false framing pattern.

3. The method of claim 2, wherein the given value by which the first threshold value is increased is one of a value of one, a value less than one, and a value greater than one.

4. The method of claim 1, further comprising the step of declaring a frame alignment condition when a bit position is identified as a potential framing bit position and no other bit position is identified as being associated with a false framing pattern.

5. The method of claim 1, wherein the data stream is received from a T1 data transmission line.

6. Apparatus for use in aligning frames in a receiver of a data transmission system, the apparats comprising:

at least one processing device operative to: (i) check a bit position associated with a received data stream to determine a number of bits in the bit position that match a predetermined bit pattern and compare the number to a first threshold value and a second threshold value, wherein a bit position is identified as being associated with a false framing pattern when the number is not less than the first threshold value and identified as a potential framing bit position when the number is not less than the second threshold value, and (ii) change the first threshold value when a bit position is identified as a potential framing bit position and another bit position is identified as being associated with a false framing pattern.

7. The apparatus of claim 6, wherein the first threshold value is increased by a given value for every frame that a bit position is identified as a potential framing bit position and another bit position is identified as being associated with a false framing pattern.

8. The apparatus of claim 7, wherein the given value by which the first threshold value is increased is one of a value of one, a value less than one, and a value greater than one.

9. The apparatus of claim 6, wherein the processing device is further operative to declare a frame alignment condition when a bit position is identified as a potential framing bit position and no other bit position is identified as being associated with a false framing pattern.

10. The apparatus of claim 6, wherein the data stream is received from a T1 data transmission line.

11. A receiver of a data transmission system, comprising:

frame alignment equipment operative to: (i) check a bit position associated with a received data stream to determine a number of bits in the bit position that match a predetermined bit pattern and compare the number to a first threshold value and a second threshold value, wherein a bit position is identified as being associated with a false framing pattern when the number is not less than the first threshold value and identified as a potential framing bit position when the number is not less than the second threshold value, and (ii) change the first threshold value when a bit position is identified as a potential framing bit position and another bit position is identified as being associated with a false framing pattern.

12. The receiver of claim 11, wherein the first threshold value is increased by a given value for every frame that a bit position is identified as a potential framing bit position and another bit position is identified as being associated with a false framing pattern.

13. The receiver of claim 12, wherein the given value by which the first threshold value is increased is one of a value of one, a value less than one, and a value greater than one.

14. The receiver of claim 11, wherein the frame alignment equipment is further operative to declare a frame alignment condition when a bit position is identified as a potential framing bit position and no other bit position is identified as being associated with a false framing pattern.

15. The receiver of claim 11, wherein the data stream is received from a T1 data transmission line.

* * * * *